United States Patent [19]
Burkhart et al.

[11] 3,716,421
[45] Feb. 13, 1973

[54] COMPOSITIONS FOR IMPROVED SOLDERABILITY OF COPPER

[75] Inventors: John H. Burkhart; Edward C. Slick, both of Warren, Pa.

[73] Assignee: GTE Sylvania Incorporated

[22] Filed: March 19, 1971

[21] Appl. No.: 126,199

[52] U.S. Cl. ............... 148/6.14 R, 29/488, 252/390
[51] Int. Cl. ................................................ C23f 7/00
[58] Field of Search......252/390; 29/488; 148/6.14 R

[56] References Cited

UNITED STATES PATENTS

| | | | |
|---|---|---|---|
| 3,334,054 | 8/1967 | Howard | 252/390 |
| 3,382,087 | 5/1968 | Ostrowski | 106/1 X |
| 2,803,604 | 8/1957 | Meighen | 252/390 |
| 2,941,953 | 6/1960 | Hatch | 252/390 X |
| 2,776,918 | 1/1957 | Bersworth | 148/6.14 |
| 3,562,039 | 2/1971 | Strohmayer | 29/488 |

FOREIGN PATENTS OR APPLICATIONS

| | | | |
|---|---|---|---|
| 1,065,995 | 4/1967 | Great Britain | 148/6.14 |
| 1,031,503 | 6/1966 | Great Britain | 148/6.14 |
| 967,086 | 8/1964 | Great Britain | 148/6.14 |
| 41,817 | 11/1965 | Germany | 148/6.14 |

OTHER PUBLICATIONS

Chem. Abstracts, Vol. 64 (1966) p. 13882a.

*Primary Examiner*—Ralph S. Kendall
*Attorney*—Norman J. O'Malley, Donald R. Castle and William H. McNeill

[57] ABSTRACT

The solderability of copper and copper alloys is improved by applying a composition comprising certain triazole compounds, a carrier to impart a uniform coating on the material to be soldered and a solvent for the triazole and the carrier.

3 Claims, 2 Drawing Figures

INVENTORS
JOHN H. BURKHART
EDWARD C. SLICK
BY
Donald R. Castle
ATTORNEY

COMPOSITIONS FOR IMPROVED SOLDERABILITY OF COPPER

BACKGROUND OF THE INVENTION

Soldering has long been used as a method for joining materials and as a method for application of a dissimilar material to a substrate. Soldering has generally been considered to be a relatively easy method of application, however, generally an uneven application of the solder usually occurs primarily because generally the solder does not alloy with the metal uniformly. The major reason is because the surfaces to which the solder is being applied does not remain uniformly chemically active to enable the alloying to proceed uniformly. Uneven application of solder also results in an inherently wasteful process since more than the optimum amount of solder is applied in many areas of the piece being soldered. In some instances to give a smooth overall appearance the excess solder is removed usually by mechanically grinding. In soldering of copper and the copper alloys such as bronze, brass, the uneven application of solder is quite pronounced. In addition, adherence or bonding is less than desired. Improved solderability results in a uniform, continuous smooth surface of solder over the base metals with a reduction in the amount of solder used.

It is believed, therefore, that a composition useful in improving solderability of copper and copper alloy material and a method for treating these alloys is an advancement in the art.

OBJECTS AND SUMMARY OF THE INVENTION

It is an object of this invention to provide a continuous, protective film of triazole containing compounds over a chemically active surface of copper or copper alloys which will retain the activity and thereby allow soft solders to alloy with the base material for creating good solder-metal adherence.

An additional object of this invention is to provide a continuous film which protects the active copper alloy surface from atmospheric or environmental degradation of the active surface.

Another object of this invention is to provide a film which promotes solder-to-metal adherence.

Still another object of this invention is to provide a simple method of application of the beneficial film-forming triazole compound over a chemically active surface.

One other object is to provide a composition whereby the active triazole group is mixed with a wetting agent and a carrier to impart coating characteristics.

In accordance with one aspect of this invention, there is provided a composition for treating materials of copper and copper alloys prior to the application of solder that comprises an effective amount of a hetrocyclic compound having as an active constituent at least one triazole group, a wetting agent to impart a uniform coating over the materials and a carrier for the triazole and the wetting agent.

In accordance with another aspect of this invention, there is provided a method for treating a copper or copper alloy material that comprises treating the surface of the material with an acid to render the surface chemically active and thereafter applying a uniform coating of the compositions containing the triazole compound, the wetting agent, and the carrier.

DETAILED DESCRIPTION OF THE PREFERRED EMBODIMENTS

Figure 1:
FIG. 1 is a photograph of a copper substrate to which solder has been applied by the prior art method.

For a better understanding of the present invention, together with other and further objects, advantages and capabilities thereof, reference is made to the following disclosure and appended claims in connection with the above description of some of the aspects of the invention.

Certain triazole compounds have been found to be useful in the protection of copper and copper alloys from corrosion when these materials are in contact with water and in the presence of other anodic metals.

It has been discovered, however, that many of these triazole compounds when incorporated into a composition containing a wetting agent and a carrier to impart a uniform coating over the copper and the copper alloys when they are in a chemically active state yields an unexpected benefit. Apparently when the foregoing composition is used to treat a chemically active copper-containing surface, a copper complex is formed. The formation of the complex retains the surface activity of the metal being soldered and enables the solder to unite with the metal to produce a uniform coating of solder over the copper containing surface. It is believed to be unexpected that such benefits occur because other materials used to impart corrosion protection such as certain dichromates and certain oil coatings actually retard the formation of smooth solder application.

The triazole compounds that can be used are those hetrocyclic compounds that have at least one triazole group such as 1,2,3 triazole, benzotriazole, tolutriazole and bis benzotriazoles. Additionally, the aromatic group can contain various substituents such as, for example, alkyl amino, alkanoylamine, and the like. All that is necessary is that there is at least one functional triazole group to react with the chemically active copper containing surface.

Depending upon the triazole compound used and its solubility, a compatible wetting agent and a carrier is used to aid in achieving a uniform coating over the copper containing surface.

Suitable wetting agents include glycols, aliphatic alcohols, cellosolve, carbowax and emulsified mineral oil. While water is the preferred carrier, lower alkanols, acetone kerosene and other petroleum solvents can be used. Solutions of the three components are preferred, however, fine emulsions that do not segregate into layers can be used since a uniform coating of the chemically active copper containing surface can be achieved. Any treatment that will coat the chemically active copper surface can be used to achieve the benefits of this invention. Preferred compositions are those that have tolutriazole or the active ingredient with a wetting agent which dissolves the tolutriazole and water as the carrier.

The minimum effective amounts of triazole compounds in the composition is surprisingly quite low. In most instances, the amount of triazole that is effective can be as low as about 0.01 percent by weight of the total composition. Although larger amounts up to about 5 percent by weight can be used, it is seldom necessary to exceed about 1 percent when a wetting agent and a carrier is used to impart a uniform coating over the copper bearing surface. The amount of wetting agent employed can be as low as 2 percent by weight of the total composition, however, up to 40 percent can be used with good results. It is generally preferred to use an amount of wetting from about 3 percent to about 10 percent by weight of the total composition.

The surface treatment prior to the application of solder has an effect upon the subsequent application of solder. Generally, the surface is treated with various acids which serve a variety of functions including removal of any scale, oxides and the like in addition to rendering the surface chemically active. Suitable acids can include nitric, phosphoric, acetic and the like or mixtures of these acids. After treatment with acid, the surface is generally rinsed with water to remove any residual acid and thereafter the composition of this invention is applied. It is necessary to apply the composition before the surface has become chemically inactive, therefore, since oxides can form in a relatively short period of time, it is preferred to apply the coating as soon as possible after the acid treatment, preferably within 1 minute after the excess acid has been removed. Sufficient composition is used to coat the surfaces of the copper bearing material. The surfaces are then air dried and the solder can be applied immediately or stored for relatively long periods of time such as over a month. Upon application of the solder, a uniform and smooth application of solder is achieved. Additionally, the surfaces which do not have solder can be coated with the triazole compound and do not deteriorate since it was previously known the triazoles used act as corrosion inhibitors. As can be appreciated, practice of this invention results in strong joints, smooth solder and reduces the amount of solder used and in many instances eliminates costly steps required to remove excessive amounts of solder.

Figure 2:
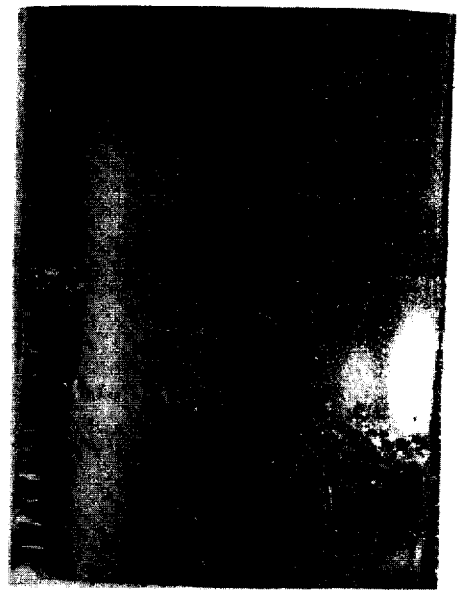
FIG. 2 is a photograph of a copper substrate to which solder has been applied utilizing this invention.

With particular reference to FIG. 1, there is shown a photograph of a copper substrate to which solder has been applied after acid treating the surface. The solder application is uneven and shows evidence of poor adherence. With particular reference to FIG. 2, there is shown a photograph of a substantially identical substrate which has been processed substantially identical to that shown in FIG. 1 except that the surface after acid treating the surface is coated with a composition of this invention utilizing tolutriazole as the hetrocyclic compound containing the triazole group. The coating of solder is continuous, smooth and has excellent adherence to the substrate.

To more fully illustrate the subject invention, the following detailed examples are presented. All parts, percentages and proportionals are by weight unless otherwise indicated.

EXAMPLE 1

Brass bases for lamp sockets are dipped into an acid composition containing 20 percent by volume of nitric acid, 40 percent by volume of phosphoric acid and 40 percent by volume of acetic acid. Three water rinses are applied for one-half to 2 minutes each. After the third water rinse, the bases are allowed to drain for about 30 seconds. The bases are then submerged into a bath containing about 4.0 percent by weight of emulsified kerosene, about 0.05 percent by weight of tolutriazole and the remainder water as a solvent. The bases are thereafter dipped in a 60–40 molten solder at 440° F and complete wetting of the surfaces is observed.

Bases treated identically except without the tolutriazole present do not have the solder completely wetting the surfaces which are dipped into the molten solder. Additionally, bases not treated with the tolutriazole discolor upon storage whereas those having the tolutriazole treatment show no signs of discoloration or degradation of soldering characteristics even after prolonged storage.

In other tests, it is shown that it is necessary to apply the tolutriazole within a relatively short time after the acid treatment and water rinse steps. The foregoing indicates it is necessary to apply the triazoles to a chemically active surface. It is generally preferred to apply the triazole within one minute after the last water rinse.

EXAMPLE 2

Essentially the same procedure is used on brass strips as in Example 1 except that a composition comprising about 0.5 percent by weight of benzotriazole, about 4 percent carbowax as a carrier and the remainder water is used. The subsequent application of solder shows uniformity of application and no spots that have large amounts of solder and no spots that are not covered with solder.

Substantially similar results are achieved when other copper alloys and copper materials are coated instead of brass.

While there have been shown and described what are at present considered the preferred embodiments of the invention, it will be obvious to those skilled in the art that various changes and modifications may be made therein without departing from the scope of the invention as defined by the appended claims.

What is claimed is:

1. In the process wherein copper containing surfaces are treated prior to the application of solder thereto, the improvement comprising
    a. applying a coating of an acid to said surface,
    b. rinsing said surface with water to remove residual acid and
    c. within about one minute after said residual acid removal applying a relatively uniform coating of a hetrocyclic triazole-containing compound over said copper containing surface.

2. A process according to claim 1 wherein said triazole compound is tolutriazole.

3. A process according to claim 2 wherein solder is applied to said copper containing surface having a uniform coating of said tolutriazole.

* * * * *